United States Patent [19]

Benson et al.

[11] 4,186,438
[45] Jan. 29, 1980

[54] INTERACTIVE ENQUIRY SYSTEM

[75] Inventors: Paul H. Benson; Michael L. Kingdom-Hockings, both of Chandlers Ford; Brian H. Middleton; Martin C. Pinnell, both of Winchester; Thomas E. Robinson, Romsey; Richard E. Sheeler, Winchester; John Simmons, Chandlers Ford, all of England

[73] Assignee: International Business Machines Corporation, Armonk, N.Y.

[21] Appl. No.: 778,181

[22] Filed: Mar. 16, 1977

[30] Foreign Application Priority Data

Mar. 17, 1976 [GB] United Kingdom .............. 10813/76

[51] Int. Cl.² .......................... G06F 3/04; G06F 7/06; G06F 13/06
[52] U.S. Cl. ................................................. 364/200
[58] Field of Search ... 364/200 MS File, 900 MS File

[56] References Cited
U.S. PATENT DOCUMENTS

| 3,394,246 | 4/1963 | Goldman | 235/61.7 |
|---|---|---|---|
| 3,564,509 | 2/1971 | Perkins et al. | 364/200 |
| 3,569,938 | 3/1971 | Eden et al. | 364/200 |
| 3,686,637 | 8/1972 | Zachar et al. | 364/200 |
| 3,696,335 | 10/1972 | Lemelson | 340/149 A |
| 3,771,135 | 11/1973 | Huettner et al. | 364/200 |
| 3,810,105 | 5/1974 | England | 364/200 |
| 3,909,798 | 9/1975 | Wallach et al. | 364/200 |
| 3,938,097 | 2/1976 | Niguette | 364/200 |
| 4,008,460 | 2/1977 | Bryant et al. | 364/200 |

FOREIGN PATENT DOCUMENTS

| 1354827 | 5/1974 | United Kingdom | 364/200 |
|---|---|---|---|
| 1437883 | 6/1976 | United Kingdom | 364/200 |

Primary Examiner—Mark E. Nusbaum
Attorney, Agent, or Firm—Karl O. Hesse

[57] ABSTRACT

Described is an interactive enquiry system in which a complete data base is contained at a host computer. Local terminal sub-systems are remotely connected to the host with each local sub-system containing a local data base. Each local data base is dynamically maintained so that the most frequently used pages are retained in local storage. If storage space needs to be created, the least frequently used pages are discarded from the local data base.

11 Claims, 28 Drawing Figures

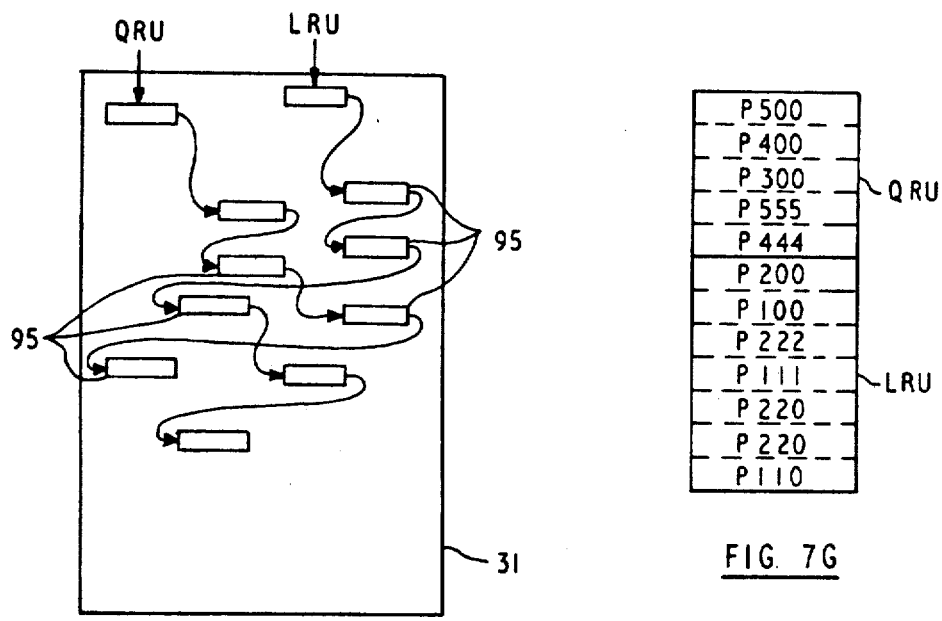
FIG. 7H
FIG. 7G
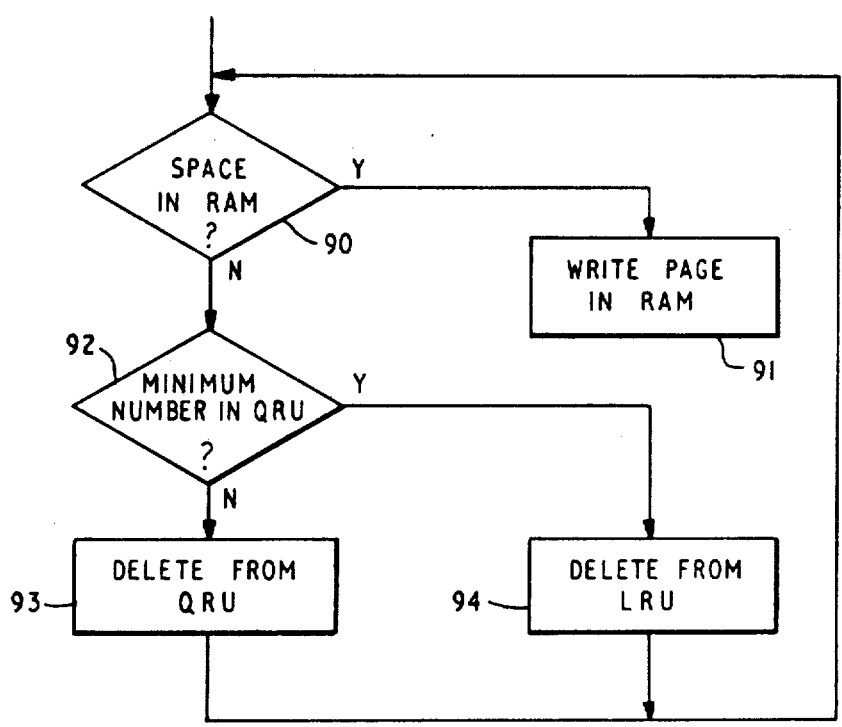
FIG. 7I

| TRACK NO. | CONTENTS |
|---|---|
| 1 - 4 | RAM BACK-UP |
| 5 - 13 | LOCAL GAZETTEER & SUBSETS |
| 14 - 20 | CITY PAIR / GAZETTEER - GROUP A |
| 21 - 23 | OVERFLOW GROUPS A & B |
| 24 - 29 | CITY PAIR / GAZETTEER - GROUP B |
| 30 - 39 | JOURNAL TRACKS |
| 40 | BALANCE TRACK |
| 41 - 46 | JOURNAL TRACKS |
| 47 - 54 | CITY PAIR / GAZETTEER - GROUP C |
| 55 - 58 | OVERFLOW GROUPS C & D |
| 59 - 67 | CITY PAIR / GAZETTEER - GROUP D |
| 68 - 77 | SPARE |

DIR    PAGES / SPACE

| TRACK NO. | CONTENTS |
|---|---|
| 1 – 4 | RAM BACK-UP |
| 5 – 13 | LOCAL GAZETTEER & SUBSETS |
| 14 – 30 | JOURNAL & BALANCE |
| 31 + 32 | DIRECTORY |
| 33 – 37 | SPARE |
| 38 – 77 | CITY PAIR / GAZETTEER PAGES |

| B1 | B2 | B3 | B4 | B5 | B6 | B7 | B8 | B9 | B10 |
|---|---|---|---|---|---|---|---|---|---|
| NO. | | | | EXT. | TYP | ADDRESS | | USE | STAT |

PRIMARY: | NO. | | EXT | TYP | USE | OFLO |  FIG. 13A

SECONDARY: | NULL | | — | TYP | — | OFLO |  FIG. 13B

TRACK A — TRACK B

| ENTRY NO. | TRACK A | TRACK B |  |  |  |
|---|---|---|---|---|---|
|  |  | EXT | TYP | USE | OFLO |
| 1 | NULL | — | S | — | 8 |
| 2 | A A A A | 2-3 | P | | 1 |
| 3 | NULL | — | S | — | 1 |
| 4 | NULL | — | S | — | 0 |
| 5 | B B B B | ≤1 | P | | 0 |
| 6 | C C C C | 1-2 | P | | 2 |
| 7 | D D D D | ≤1 | P | | 0 |
| 8 | NULL | — | S | — | 0 |
| 9 | NULL | — | S | — | 2 |
| 10 | E E E E | ≤1 | P | | 0 |
| 11 | NULL | — | S | | 1 |

INTERACTIVE ENQUIRY SYSTEM

BACKGROUND OF THE INVENTION

This invention relates to an interactive enquiry system having a distributed data base and which may be used, for example, in a seat reservation and/or ticketing system.

Computerized reservation and ticketing systems in the past have comprised a central processor used to control a central data base. A number of remote terminals, normally consisting of a keyboard and display or printer, were connected to the central processor. Whenever the ticketing/reservation clerk wished to make an enquiry or conduct a transaction it was necessary for a connection to be established with the central data base.

Such an arrangement suffers from three disadvantages. Firstly, the cost of establishing the connection between the remote terminal and the host computer is not inconsiderable and is increasing all the time. Secondly, the time required to establish the connection adds to the response time of the clerk to answer a query or complete a transaction. Thirdly, the whole system is dependent upon the reliability of the communication links.

The Complete Specification of our co-pending Application for Letters Patent No. 16749/74, now UK Pat. No. 1437883 describes a ticketing system in which a number of local data bases are established so that transactions can be completed without the need for accessing the central data base for every transaction. Such an approach clearly requires local storage for the local data base and a local processing capability for the control of that local data base and the terminals connected to it. Therefore when considering the relative costs between a centralized data base system and a distributed data base system, some balance must be struck between the costs of local storage and the costs of communication. All other things being equal, faster response times represent reduced costs due to increased productivity on the part of the ticketing/reservation clerk.

The present invention is concerned with a distributed data base system employing storage management arrangements which tend to reduce the need for excessively large amounts of local storage. Methods of local storage management based upon last use or recency of use are known in computer systems employing a cache memory. Last use or recent use are however, not the best criteria for choosing data items to be stored in a local data of an interactive enquiry system.

SUMMARY OF THE INVENTION

According to the present invention, an interactive enquiry system comprises a host data processor, a central data store controlled by the host processor and adapted to store a data base, a plurality of local subsystems connectible to the host processor and each including a local processor for controlling access to the host processor and a local data store connected to the local processor and adapted to store part only of the data base, at least one enquiry terminal in each subsystem connected to the local processor for accessing any accessible item in the data base stored in the central store, and means in each subsystem for retaining in the local store those items in the data base most frequently requested by the terminal or terminals in that particular subsystem, whereby in operation the most popular items requested in a particular subsystem may be accessed without accessing the host processor.

BRIEF DESCRIPTION OF THE DRAWINGS

FIG. 7A-7I illustrate how pages can be stored in a random access memory.

FIGS. 13A-13B show the format for directory entries for the method shown in FIG. 11.

DESCRIPTION OF THE PREFERRED EMBODIMENT

Figure 1:
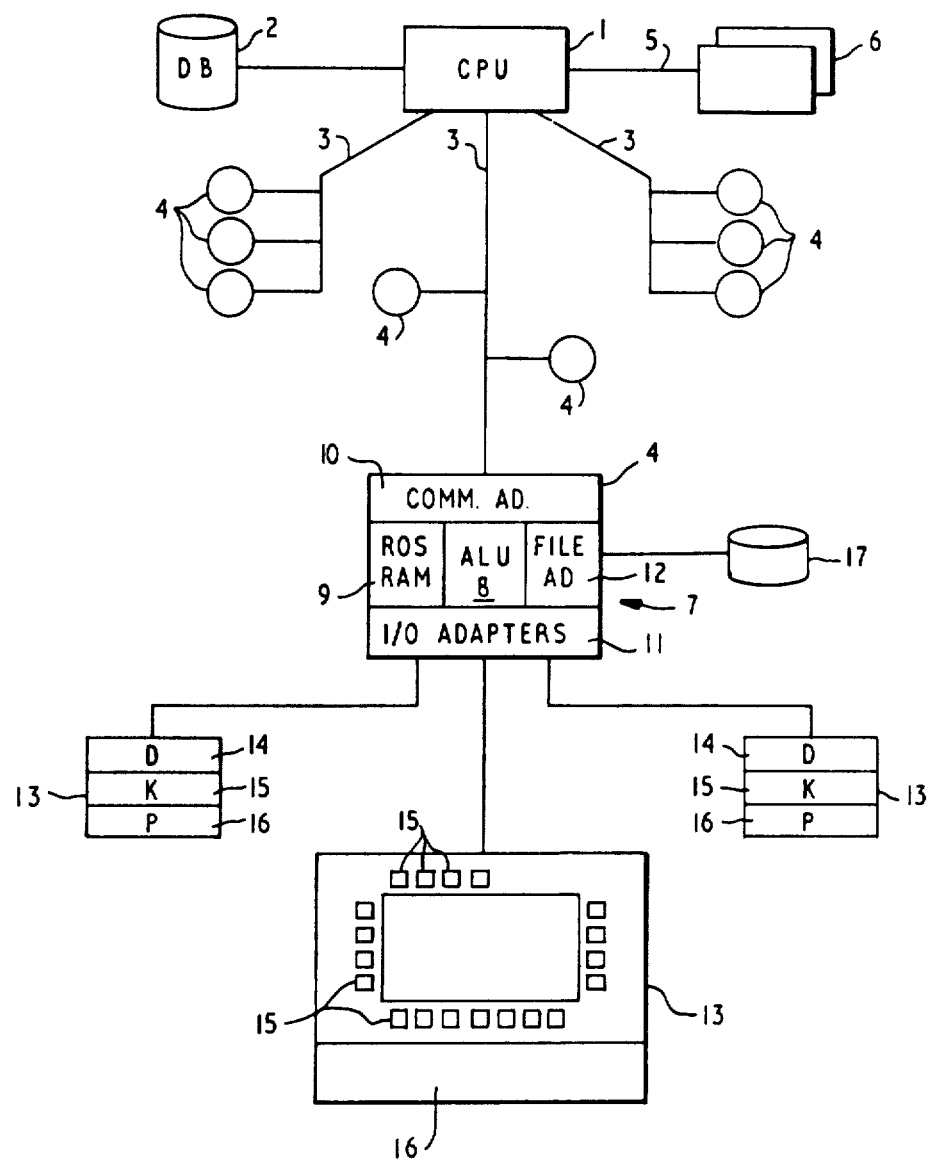
FIG. 1 is a schematic of a ticketing system employing a distributed data base.

Referring now to FIG. 1, a central host processor 1, for example an IBM (Registered Trademark) system 370/model 145 computer, has a central data base 2 containing a complete ticketing data base. Data base 2 may be stored, for example, on IBM (Registered Trademark) 3330 or 3340 disc files although any other bulk storage device could be used.

Connected to the host processor 1 through communication links 3 are local ticketing subsystems 4 which are located at each ticket issuing station in the network. The network might be constituted by a complete railway network. To allow tickets for other railway systems to be sold, host processor 1 may be connected through a communication link 5 to other processors 6 which in turn contain the data bases associated with their own network.

Each local subsystem comprises a controller or local processor 7, for example an IBM (Registered Trademark) 3773 Model 2 Controller which contains an arithmetic logic unit 8, semiconductor read only storage and semiconductor random access memory 9, a communications adapter 10 for connecting the controller to the remote host 1, input/output adapters 11, and a storage file adapter 12. An example adapter usable in the local processor is shown in U.S. Pat. No. 3,714,635. Connected to the input/output adapters 11 are a number of data entry units 13; each data entry unit comprises a display screen 14 for passing messages to the ticketing clerk and for displaying details of the transaction being conducted, a number of keys or buttons 15 by which the clerk can enter data and/or initiate functions, and a printer 16 for issuing tickets when a transaction is completed. An example of a data entry unit having switches 15 appears in U.S. Pat. No. 3,699,531.

Attached to the file adapter 12 is a small data store 17 for storing a portion of the data base locally. Data store 17 may, for example, be a floppy magnetic storage disc file such as the IBM (Registered Trademark) Diskette. The size of the store 17 will determine the size of the local data base and this size must be weighed against its cost.

Figure 2:
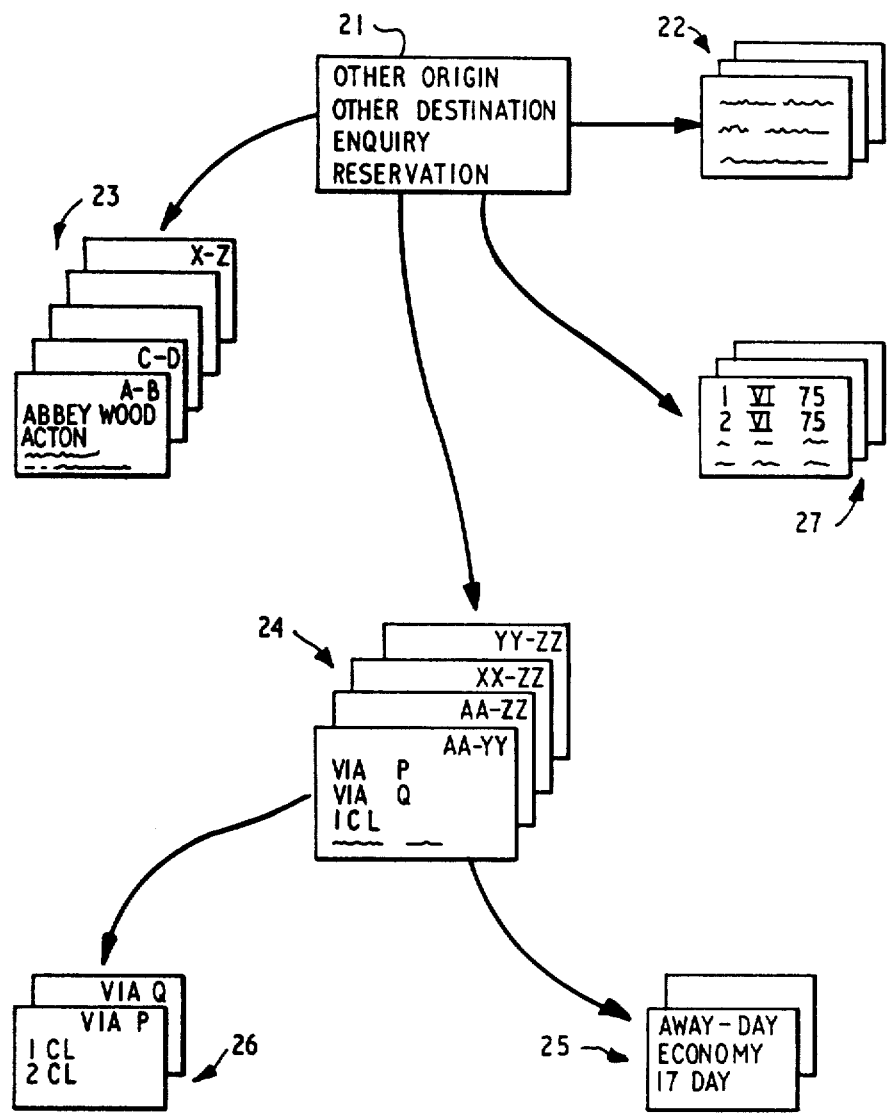
FIG. 2 illustrates the structure of the data base.

FIG. 2 illustrates how the data base used in the ticketing system shown in FIG. 1 is structured. The data base is built up from a number of pages or program segments (items) in a tree structure as is described in detail in our UK Pat. No. 1437883, issued Sept. 29, 1976. Briefly, however, page or program segment 21 represents the root of a data base for ticketing and from which other pages of the data base can be accessed. In addition, page 21 can be used to gain access to other pages 22 used to display pages from an enquiry or reservation data base. Page 21 also contains pointers to pages 23 which are used to display place names, pages 27 which are used to display dates, and pages 24 which are used during the display of city pairs. In turn, pages or program segments 24 have pointers to other pages, for example, pages 26 which are used to create alternative routes when there is a choice of route between a particular city pair and pages 25 which are used to display special fares.

Figure 3:
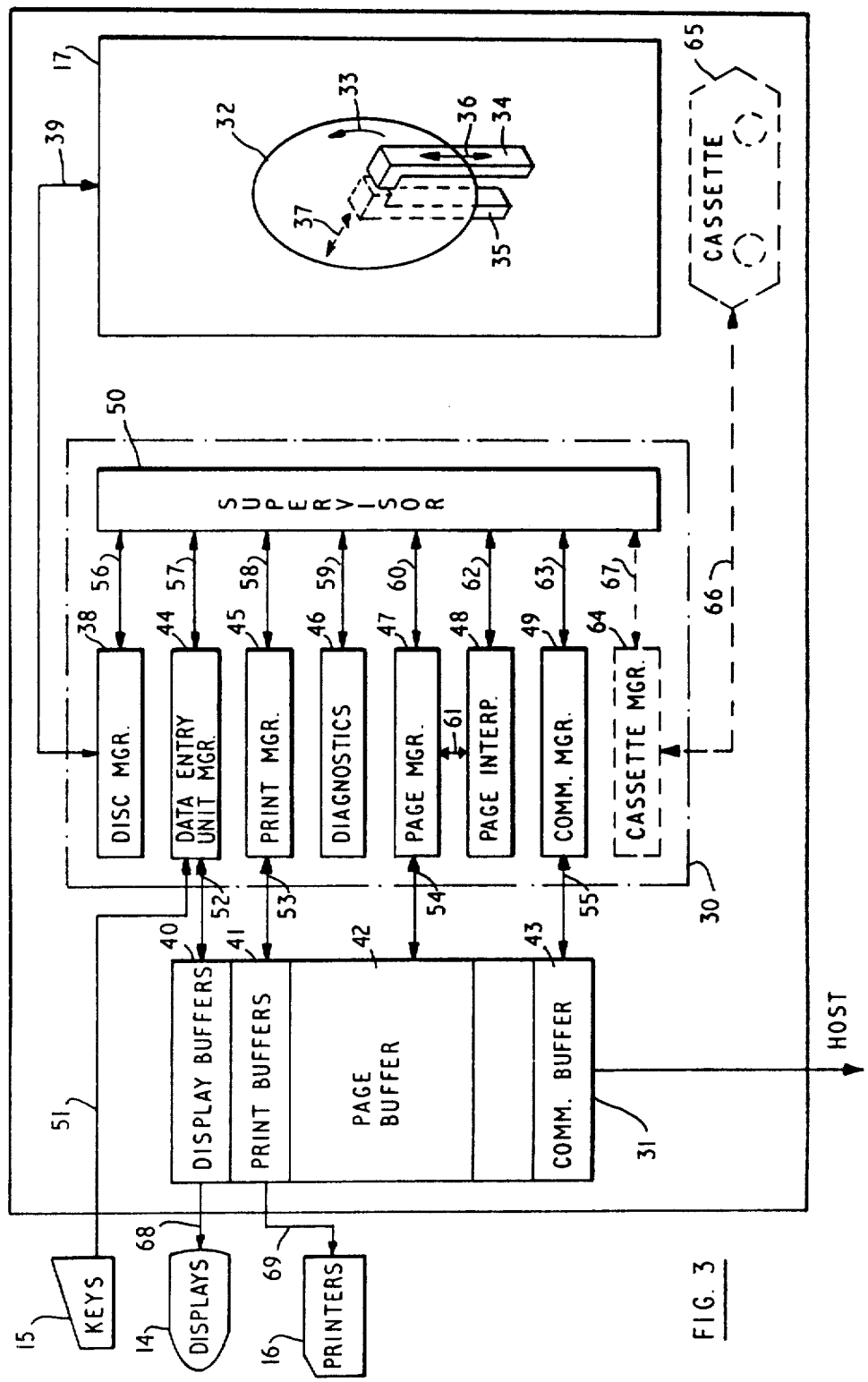
FIG. 3 illustrates the configuration of a local subsystem.

FIG. 3 shows the organization of the local subsystem 4. It is envisaged that where the controller is an IBM (Registered Trademark) 3773 Model 2 Controller, up to three data entry units can be connected to the controller. Within the controller is a disc file 17 which consists of a floppy magnetic recording disc 32 continuously rotating in a vertical plane as indicated by arrow 33. The disc 32 is sandwiched between a magnetic recording head carried on arm 34 and a pressure pad carried on arm 35. The arms 34 and 35 can be moved along a radius of the disc 32 as shown by arrow 36 so as to access different tracks on the disc 32. When a particular track is accessed and information is stored thereon or read therefrom, the pressure pad on the arm 35 is moved toward the disc as indicated by arrow 37 to bring the magnetic recording surface into contact with the recording head. Such a disc store can hold up to 256K bytes of data in some 77 tracks.

Also located with the controller is a random access store 31. The store 31 is divided into a number of sections, that is display buffers 40, printer buffers 41, a page or program segment buffer 42, and a communication line buffer 43. Typical sizes for these buffers are 2,400 bytes for the display buffers 40; 600 bytes for the printer buffers 41; 600 bytes for the communication line buffer 43; and 10,000 bytes for the page buffer 42.

Movement of data within the subsystem 4 is controlled by means of a control unit 30. It will be appreciated that the control unit 30 can be a special purpose hardware unit or it can consist of general purpose hardware configured and constrained to operate in a particular way by microprogramming techniques. Using an IBM (Registered Trademark) 3773 Model 2 controller, the control unit is configured using read only storage, random access storage and microcode in a similar manner to that known in the art. An example of the level of knowledge in the prior art is "Microprocessors and Microcomputers" by Branko Soucek, published Mar. 1, 1976 by John Wiley & Sons, Inc. Since such microcode, etc. does not form part of the present invention and is well within the scope of the competent system designer, no details are given within this specification.

At the heart of the control unit 30 is a supervisor 50 whose purpose is to control the overall operation of the different parts of the system. An example of a supervisor appears at pp. 61, 147-182 of "Programming Real-Time Computer Systems" by James Martin, Copyright 1965 by Prentice-Hall, Inc. Data being read to and from the disc file 17 on line 39 are organized and controlled by means of a disc manager 38 which in turn is controlled by the supervisor 50 through line 56. In a similar manner, signals on line 51 from the buttons or keys 15 of the data entry unit are interpreted by a data entry unit manager 44 which in turn is supervised by the supervisor 50 through line 57. The data entry unit manager 44 also has the function of assembling data to be displayed within the display buffer 40 along line 52. Data within the buffer 40 are transmitted along line 68 to the displays 14.

Similarly, data to be printed in printer 16 re transmitted along line 69 from the print buffer 41 where they are assembled, via line 53, under control of a print manager 45 in turn supervised by the supervisor through line 58. As was indicated earlier, communication with the host processor is through communication buffer 43 which is loaded through line 55 by a communication line manager 49. Under control of the supervisor 50 through line 63, communication line manager 49 ensures that data to be transmitted to the host processor or data received from the host are correctly formatted and synchronized.

As will be described in more detail later, the bulk of the storage space on magnetic disc 32 is occupied with items or pages (program segments) from the data base. It also contains records of transactions which have been conducted on each terminal. As an alternative, a magnetic cassette recorder 65 could be used to record journal entries and similar sorts of information in which case the recorder 65 could be controlled by a cassette manager coming under the overall supervision of the supervisor 50 through line 67. The cassette recorder could be used instead of the disc file 17 to store pages but generally would be too slow for such a purpose.

As was indicated earlier, pages or program segments can be stored within the disc drive 17 or within the page buffer 42. Pages are loaded into and out of page buffer 42 along line 54 under the control of a page manager 47 supervised along line 60 by the supervisor 50. Pages read from the buffer 42 are interpreted by a page interpreter 48 connected to the page manager 47 and the supervisor 50 by lines 61 and 62 respectively. As is now common with data processing equipment the supervisor 50 can access a diagnostics unit 46 for utilizing diagnostics programs along line 59 when a fault develops within the subsystem; this aids a service engineer in determining which unit or component of the subsystem is faulty.

As was explained earlier with reference to FIG. 2, there are within the data base a very large number of pages which define city-pairs. Thus with "n" cities or stations in a transport system, there are $n(n-1)/2$ possible city-pair combinations. Thus in order to issue a ticket for a journey between any origin and any destination a terminal must be able to locate any one of the $n(n-1)/2$ combinations. The speed with which a particular ticket can be generated will depend essentially on whether or not and where the corresponding city-pair page is stored locally or whether there is a need to access the data base at the central host processor. Storing all the city-pair pages locally is impractical since to do so would require too much local storage.

As was explained in our UK Pat. No. 1437883, a number of subsets of the data base can be stored locally. If these subsets contain the most popular city-pair combinations for that particular station, most tickets can be issued by accessing the local subset. However, the number of stations in a local subset is typically about 50 so provision must be made for accessing other city-pair pages quite quickly.

Figure 4:
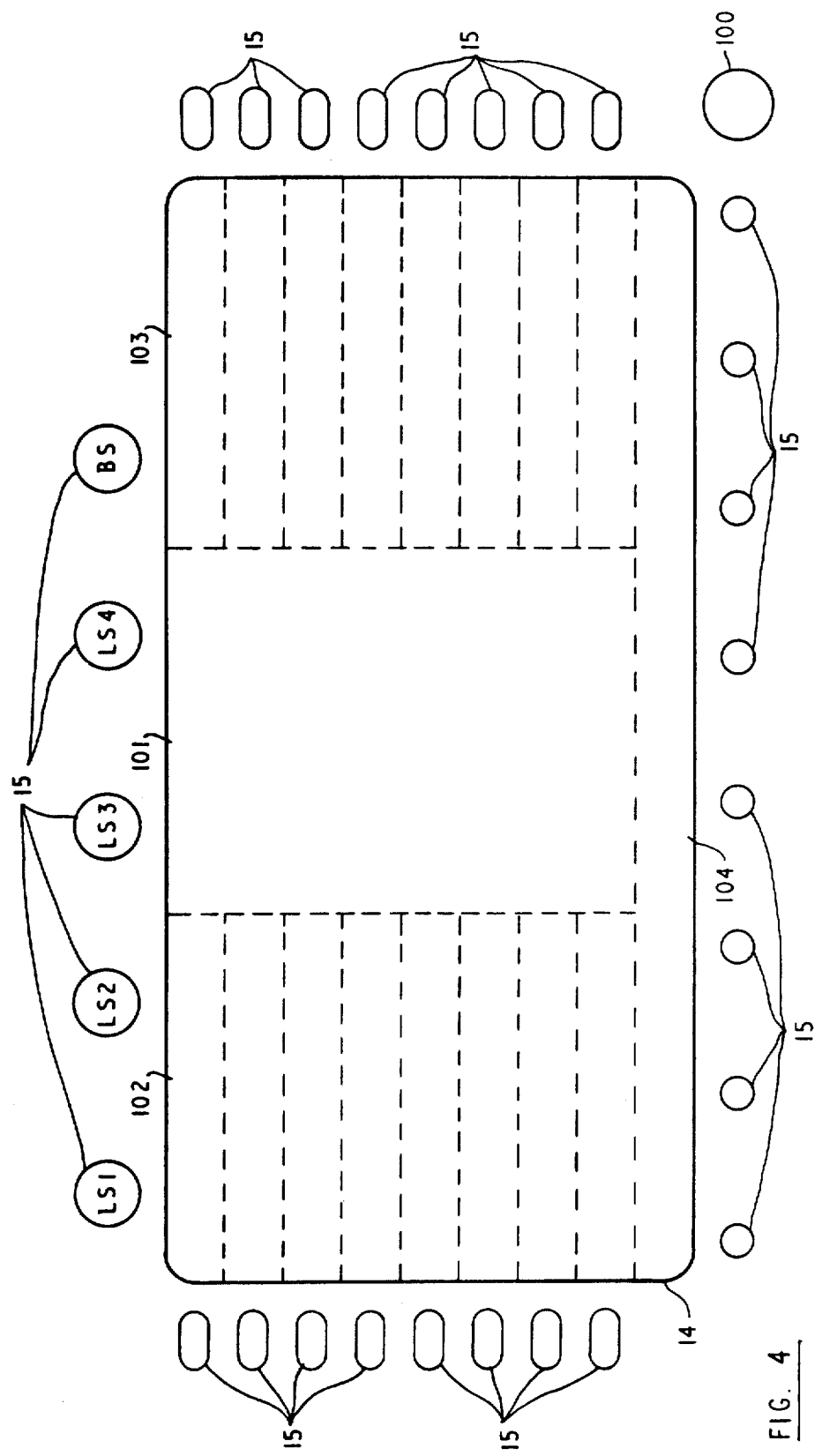
FIG. 4 illustrates an example of a ticketing clerk's display.

FIG. 4 is a view showing the display and data entry unit. The display 14 is divided into four areas. Area 101 allows ticket information to be displayed so that the ticketing clerk can control which ticket will be printed when he presses ticket button 100. The buttons 15 at the top of the screen 14 labelled LS1, LS2, LS3, LS4 and BS allow the clerk to display four local subsets of the data base and also allow him to backspace to the root of the data base. The remaining buttons or keys 15 are distributed around the screen 14. Their function is variable and the particular function they represent is displayed on an adjacent area of the screen. Thus area 102 is used to label the left-hand keys 15, area 103 is used to label the right-hand keys 15 and area 104 is used to label the bottom keys 15.

The use of the data entry unit and display to interrogate the data base is described in detail in the UK Pat. No. 1437883.

As will be explained in more detail later, if a particular journey can be created from the local subset, there is no need to access the full data base at the host processor. The embodiment to be described is aimed at distributing the data base so that the need for accessing the host is minimized. Not only does this reduce communication costs but it also ensures that a larger proportion of tickets can be issued even if the link to the host is defective.

Figure 5:
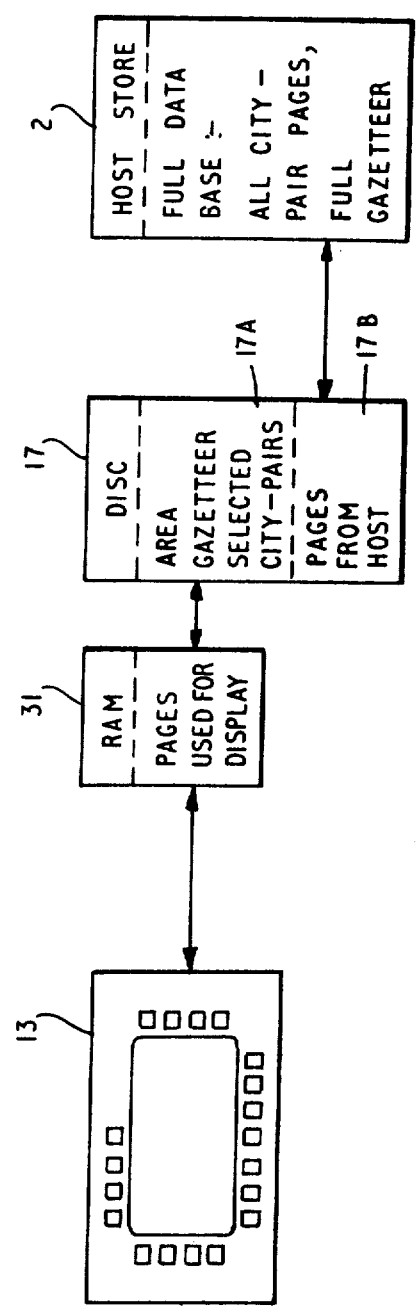
FIG. 5 is a schematic showing the distribution of the data base.

FIG. 5 is a schematic which summarizes how the data base is distributed. Displays in the data entry unit 13 are controlled from pages stored in the random access memory 31. The host store 2 contains the full data base including all city-pair pages and a full gazetteer. The gazetteer serves as a directory of city names to enable access to be made to pages representing particular city-pair combinations. Typically the full gazetteer may contain some 3,000 to 3,500 names which require some 200 pages in the data base. With 3,000 names, there are 4,498,500 possible journeys requiring some 4.5 million pages. Assuming that each city-pair page contains 20 bytes, this means that the data base would require about 90 million bytes just for city-pair pages. Clearly it is impractical to store all these in the local disc store 17 and so only the more popular pages are stored in the disc store 17. Certain tracks 17A are retained for an area gazetteer and selected city-pair pages which constitute the local subsets selected by the ticketing staff. These tracks are protected against deletion. Tracks 17B on the other hand contain pages which are fetched from the host but which are retained in storage in accordance with their frequency of use. Typically, the IBM (Registered Trademark) Diskette floppy magnetic disc can be arranged to store data in 77 tracks. Each of the 77 tracks contains 26 blocks of data, each block being constituted by 128 bytes. With the local subsets and area gazetteer requiring some 8 tracks up to 47 tracks may be made available for storing pages fetched from the host data base. This means that up to 1,000 city-pair pages, in addition to fare calculation and control pages, can be fetched and stored within tracks 17B.

Apart from containing pages actually being used to create the display, the random access memory also contains the most recently or frequently used pages including pages in the local subset. It has been estimated that, with such an arrangement outlined above up to 90% of all ticket requests can be handled directly from the random access memory, and up to 99% can be handled without requiring access to the host.

Figure 6:
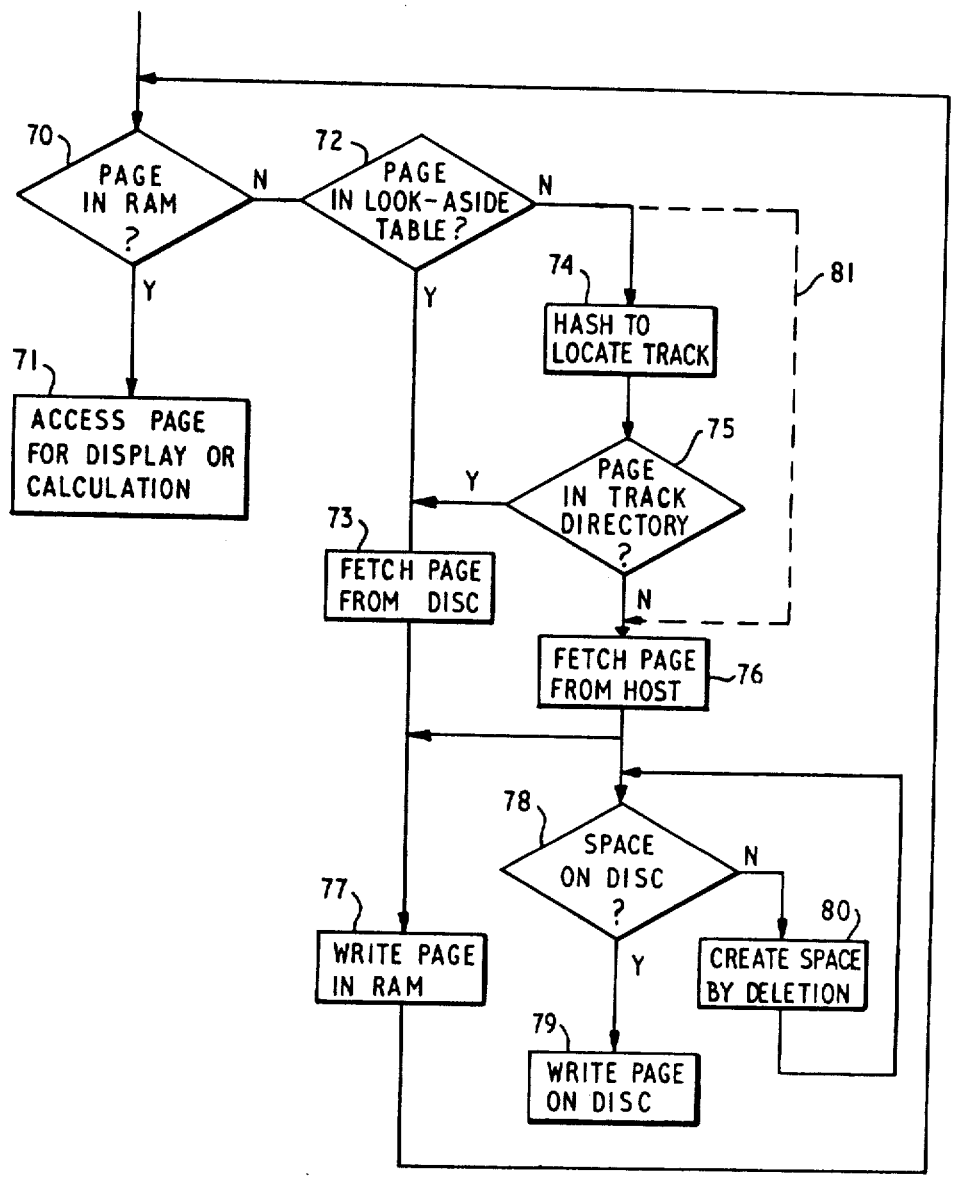
FIG. 6 is a flow chart illustrating a first method of accessing a page in the data base.

One data storage management technique will now be described with reference to FIGS. 6 to 8. FIG. 6 is a flow chart illustrating the functions performed by the supervisor 50, FIG. 3, the page manager 47, FIG. 3, and the disc manager 38, FIG. 3. When the supervisor 50 determines that a page or program segment is required it requests the page manager 47 at 70 whether or not that particular page is in the random access memory 31. If the required page is in RAM 31, then it is accessed as at 71 for display or calculation.

If the required page is not in RAM 31 the supervisor 50 determines at 72 whether the page is in a look-aside table stored in RAM which contains the address on the magnetic disc 32 of the most recently or most frequently used pages. If the address of the required page is found in the lookaside table, the page is immediately fetched at 73 by the disc manager 38 from the disc 32 and written into RAM 31 as at 77; the page can then be accessed as at 71.

If on the other hand it was determined at 72 that the page address was not in the look-aside table, it is necessary to determine whether the page is stored on the disc or whether access to the host is necessary. A preferred technique is to perform a hashing operation such as described at pp. 506–549 of "The Art of Computer Programming, Vol. III, Sorting and Searching" by Donald E. Knuth, Copyright 1973 by Addison-Wesley Publishing Company, Inc., on the number of the page required as at 74 and from this determine in which track or group of tracks on the disc 32 the page will be stored if it is present. Thus at 75 the track determined from the hash operation would be accessed and a determination would be made using the track directory to determine whether the page required was actually present. If the page is stored it can be fetched by the disc manager 38 as at 73. In this case, the look-aside table is updated, the new entry replacing that of the least recently fetched page.

If it is determined that the required page is not stored in the disc store 17, the supervisor 50 causes the communication manager 49 to fetch the required page from the host as at 76. When the page is received from the host, it is immediately written into RAM 31 as at 77 for subsequent use. Simultaneously, the supervisor 50 causes the disc manager 38 to determine whether there is storage space in the appropriate track (if hashing is used) on the disc 32 as at 78. If there is sufficient space on the disc 32, the fetched page is written into the disc store 17 as at 79 by the disc manager 38. If there is insufficient space in the disc store 17 to store the fetched page, then space is created by deletion as at 80, of the least frequently used pages provided these pages are not protected.

Thus when a page is required, the supervisor first causes the page manager 47 to determine whether the page is in RAM 31 then if necessary causes the disc manager 38 to determine whether the page is stored in the disc store 17, and then if necessary causes the communications manager 49 to fetch the page from the host. In a modification, if it is determined that the required page is not in RAM 31, access can be initiated to the host as indicated by 81 while it is determined whether the page is in the disc store 17. The supervisor 50 in this case would cancel the request to the host if the page is first fetched from the disc store 17 or would cancel the request to the disc store 17 if the page is first fetched from the host. This would prevent the accumulation of delays which might occur should the host not be accessed until after it had been determined that the required page was not stored locally.

FIG. 7 schematically illustrates how pages are brought into and deleted from the random access memory. When the page manager 47, FIG. 3, fetches a page for storage in the RAM, it first determines its position in the data base tree-structure. The position of the page above or below a threshold level determines whether the page is added to a least-recently-used (LRU) chain or to a quite-recently-used (QRU) chain. Pages at a level below the threshold are added to the LRU chain and pages above the threshold are added to the QRU chain. A minimum number of pages can be specified for the QRU chain. Each chain operates as a pushdown stack with the most recently used page at the top of the stack.

When the page buffer is full, it is necessary for space to be deleted and the algorithm illustrated in FIG. 7I can be used for this purpose.

Firstly, the page manager 47, FIG. 3, determines at 90 whether there is sufficient space in RAM for the new page. It there is, the page manager writes the new page into RAM as at 91 chaining it to the appropriate stack, that is QRU or LRU. If however, the determination at 90 is that the RAM is full and deletion is required to create space, the page manager determines at 92 whether the QRU chain contains the minimum number of pages. If it does not then the least recently used page in the QRU chain is deleted as at 93. When sufficient space has been created in this way, the new page can be stored in RAM at the top of the appropriate stack, that is QRU or LRU. If however, it was determined at 92 that the QRU chain contained the minimum number of pages, the page manager deletes the least recently used page from the LRU chain as at 94.

The use of this algorithm and the fact that the most frequently used pages statistically will be at or near the root of the tree or sub-tress, means that in operation the most frequently used pages will tend to be concentrated toward one end of the page buffer.

FIG. 7H is a schematic of the random access memory 31 illustrating how various pages 95 will be randomly distributed through the RAM. The arrows in FIG. 7H represent pointers from one page in the chain to the next page in the chain.

FIGS. 7A to 7G serve to illustrate how pages are brought into and out of the QRU and LRU stacks. It should be noted that FIGS. 7A to 7G do not represent physical positions with the page buffer but represent the logical positions within the QRU and LRU stacks.

Figure 7A:
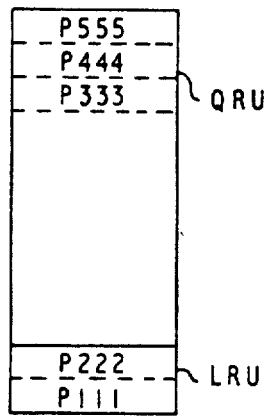

FIGS. 7A to 7F represent the two chains during 7 transactions. As represented by FIG. 7A, some five pages have been inserted into the stack. The first two pages fetched, P111 and P222 each have a position in the tree structure below the threshold level for this particular transaction and accordingly have been entered in the LRU chain. The third, fourth and fifth pages however, are at a level in the data base tree structure for this particular transaction above the threshold level and have been inserted into the QRU chain.

Figure 7B:
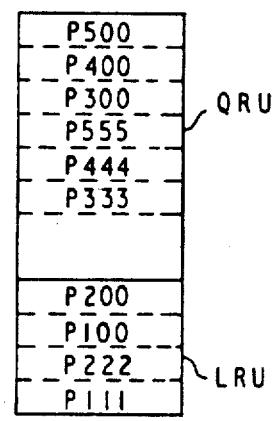

For the next transaction, represented by FIG. 7B, a further five pages P100, P200, P300, P400 and P500 have been fetched in that order. Pages P100 and P200 are below the threshold level and accordingly have been added to the LRU chain. Pages P300, P400 and P500 are above the threshold and belong to the QRU chain.

Figure 7C:
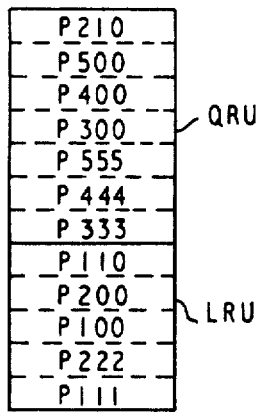

For the third transaction, represented by the FIG. 7C, assume that only two pages need to be fetched, namely P110 and P210, the first below and the second above the threshold level. This fills the page buffer and to add any new pages will require deletion of old pages, normally from the QRU stack to create sufficient space.

Figure 7D:
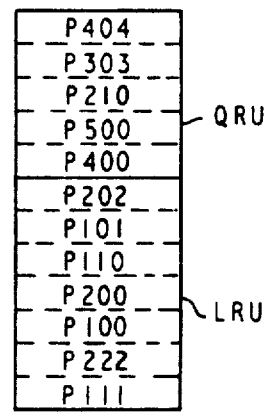

In the next transaction, FIG. 7D, assume that four pages are required, namely P101 and P202 determined to be below the threshold level and P303 and P404 determined to be above the threshold level. In this case, pages P300, P555, P444 and P333 will be deleted from the QRU chain by the page manager.

As was indicated above, a minimum number of pages can be specified for the QRU chain and assume that this minimum number is 5. As shown in FIG. 7D the QRU chain now contains this minimum number. If the next transaction where to fetch three pages of such a size that pages P210, P500 and P400 can be deleted from the QRU chain to create sufficient space while still meeting the minimum requirement then these pages will be deleted. If on the other hand, the page manager determines that the new pages require so much space in the QRU chain that the minimum number condition can no longer be fulfilled if pages are deleted from the QRU chain, the least recently used page or pages in the LRU chain is or are deleted.

Figure 7E:
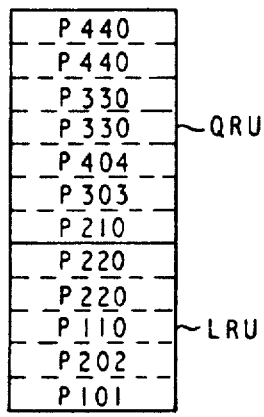

This is illustrated in FIG. 7E where two new pages P330 and P440 have been fetched and inserted into the QRU chain and pages P220 and P110 have been added to the LRU chain. To meet the requirement for a minimum number of pages in the QRU chain only pages P500 and P400 have been deleted from the QRU chain; pages at the bottom that is the least recently used pages of the LRU chain also having been deleted to create space.

Figure 7F:
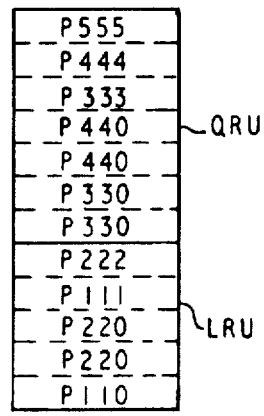

FIG. 7F illustrates the situation where the transaction shown in FIG. 7A is repeated. To maintain the minimum number of pages in the QRU chain, pages are deleted from the LRU chain. Thus pages P111, P222, P333, P444 and P555 are fetched and inserted into the QRU and LRU chains while pages P404, P303, P210, P202 and P101 have been deleted.

FIG. 7G represents the schematic where the transaction of FIG. 7B has been repeated. Thus pages P500, P400 and P300 have been fetched and inserted in the QRU chain with pages P200 and P100 inserted into the LRU chain. Sufficient space has been created by deleting pages from the QRU chain only. It is emphasized that FIG. 7 shows the logical positions in the chains as controlled by the page manager 47 and does not represent the actual physical position of the pages within the page buffer 42. As pages are deleted from the buffer 42 to create space for new pages, the page number 47 consolidates the space in the buffer so that the available space is not physically fragmented through the buffer. The combined effect of this consolidation technique and the QRU and LRU chain technique is to pack the frequently used pages at one end of the page buffer; the lower level pages are used more frequently than the higher level pages.

Figures 8A, 8B:
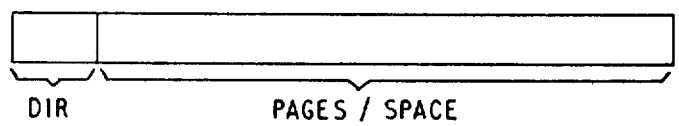
FIGS. 8A-8B illustrate how data base pages may be stored on a magnetic disc file.

FIG. 8 illustrates one technique for managing the storage on the disc file 17. The IBM (Registered Trademark) diskette contains up to 77 tracks. FIG. 8A illustrates how the various tracks are allotted to store different sorts of data. Thus tracks 1 to 4 are used to provide a copy of certain data in the random access memory RAM. Such data includes a table containing the addresses on the disc of the 32 most frequently fetched pages. The table size depends on the access pattern of the systems but typically may contain 32 entries. This most frequently fetched table serves as a look-aside table as was explained with reference to FIG. 6. Also stored in RAM and the back up tracks is a track-use table whose purpose is to keep a record of protected tracks, tracks in need of compression and also a record of the frequency of access or use of the different tracks. Thus when space needs to be created within the disc file, the disc manager can access the track-use table to determine which unprotected track is least frequently used; space can then be created on this track.

Tracks 5 to 13 are reserved for pages constituting the local subsets and area gazetteer. As such they are protected from deletion during the normal space creating process although they can be replaced if a new local gazetteer or new local subsets are created. The full gazetteer and city-pair pages are divided into four groups, A, B, C, and D. Any pages from group A are stored in tracks 14 to 20, any from group B in tracks 24 to 29, any from group C in tracks 47 to 54, and any from group D in tracks 59 to 67. Since the pages are of variable size, it is convenient to have overflow tracks 21 to 23 for groups A and B and overflow tracks 55 to 58 for groups C and D.

Tracks 30 and 39 and 41 to 46 are reserved for journal tracks; these contain entries recording which transactions have been completed at the different ticketing terminals connected to the local processor. Track 40 contains a record of the current cash balance for each terminal together with the serial number of the current transaction. Tracks 68 to 77 are reserved tracks.

It should be noted that the IBM (Registered Trademark) diskette is in contact with the recording/playback head when it is being accessed. Therefore frequently accessed tracks can cause undue wear of the diskette. Such wear can be equalized by periodically redistributing the tracks over the disc surface. Thus the track numbers in FIG. 8A do not necessarily reflect the physical position of the tracks on the disc.

Each of the 77 tracks contain 26 blocks of data, each block being constituted by 128 bytes. The beginning of each track used for page storage contains a three block directory which indicates the position within the tracks of the pages stored therein, FIG. 8B. The exact format of the directory can be of any suitable form but preferably the first eight bytes of the 3-block directory constitutes a directory heading containing, for example, the number of directory entries in use, the next block available for storage and the starting point within that block, an indication of whether an overflow area is in use and whether the track is a protected track. The directory entry for a page would normally contain, for example, the page number (for example 32 bits) the address of the page, whether it is protected, and a count of its frequency of use.

When a page is written onto the disc, the page number is hashed to determine in which group of tracks (or alternatively which track) it should be stored. Thereafter when the disc manager determines from the track-use table which track is least frequently used, it can determine from the track directory which blocks are least frequently used within the track.

The use counts in the track use table and the track directory are given a high value when a page is written into the disc file. Periodically the count is decremented, for example, once daily or at the beginning of each shift, and is restored to the high count whenever the page is used.

Periodically, pages stored on the disc file can be re-written so as to consolidate the free space and prevent undue fragmentation of space.

The storage management techniques described with reference to FIGS. 6 to 8 are particularly useful where the frequency of access to the pages or program segments is biased such that some pages are more frequently accessed than others. The alternative techniques to be described with reference to FIGS. 9 to 14 are useful where the access pattern of the pages is more random.

Figure 9:
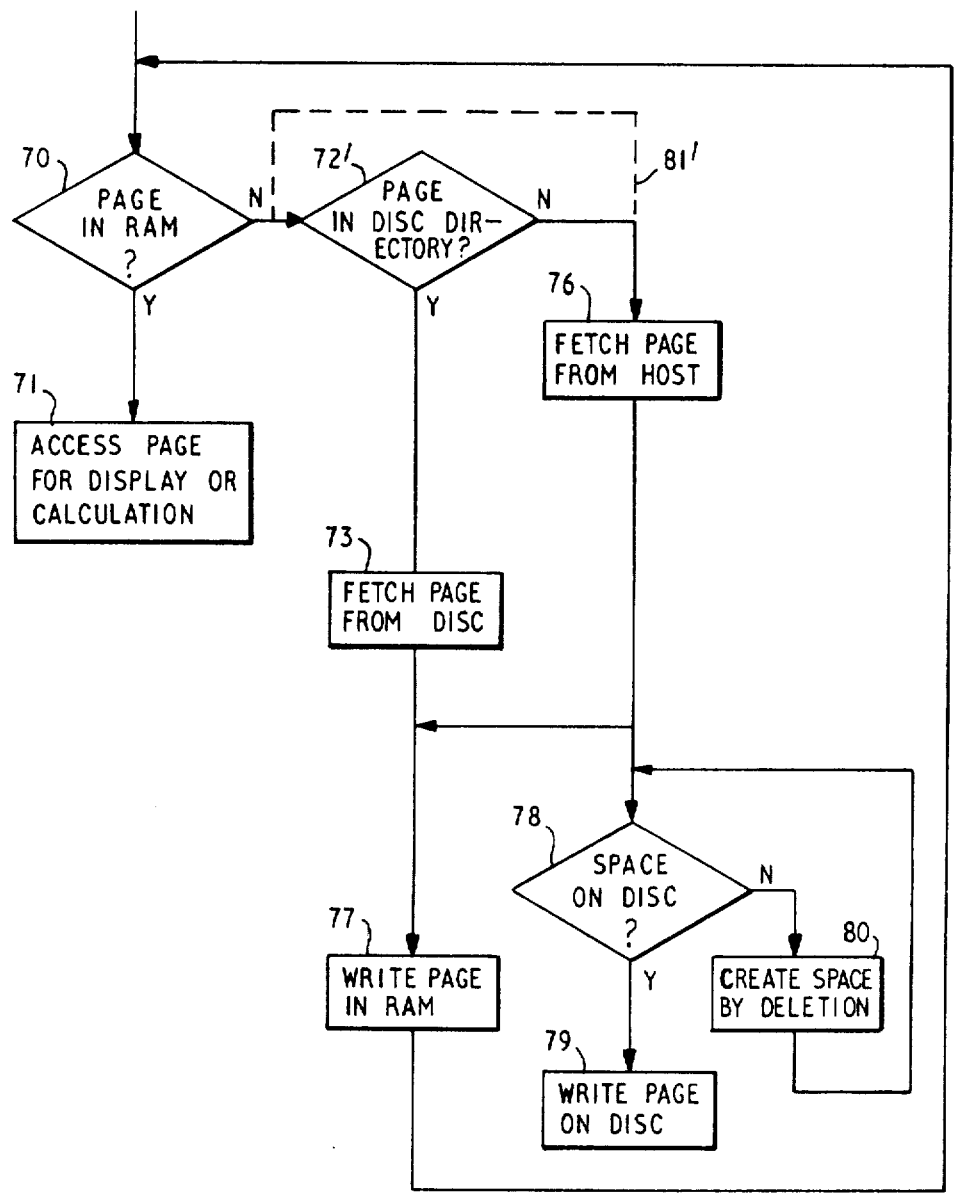
FIG. 9 is a flow chart illustrating a second method of accessing a page in the data base.

FIG. 9 illustrates an alternative technique to that shown in FIG. 6 for accessing a page of the data base. If the page manager 47, FIG. 3, indicates at 70 to the supervisor 50, FIG. 3, that the required page is not in the random access memory, a determination is made at 72' to determine whether the required page is stored in the disc directory. As will be explained in more detail with reference to FIGS. 11 and 13, the disc directory is stored in two tracks on the disc file. If the disc manager 38, FIG. 3, determines that the required page is stored in the disc file, it is fetched and written into RAM (steps 73 and 77) in a similar manner to FIG. 6. If the page is not in the disc directory, it is fetched from the host as at 76 and subsequently written into RAM and on to the disc (steps 77 to 79) in a similar manner to FIG. 6.

To prevent accumulative delays the supervisor 50 may control the communication manager 49 to fetch a page as indicated by 81' as soon as it has been determined that the desired page is not in RAM. The supervisor 50 would then monitor which of the disc manager 38 or the communication manager 49 fetched the required page first and then cancel the request to the other.

FIG. 10 schematically illustrates how the page buffer 42 may be organized. The buffer 42 is divided into two sections, one containing a directory and one containing pages and free space for pages. The boundary between the two buffer sections is floating since to have a fixed boundary would waste space. FIG. 12 is an example of a possible directory entry format consisting of 10 bytes. The first four bytes represent the page number, the fifth byte represents the extent or size of the page, and the sixth byte indicates the type of page, for example whether the page is used to create a display or whether it is used for calculation purposes only.

Bytes 7 and 8 contain the address in RAM of the page, byte 9 contains a count representing the amount of use of the page and the tenth byte represents the status. There are two ways in which the count can be used to indicate the use of the page. In a first method, the count is given a high value when the page is first written into RAM and is then periodically decremented, the high count being restored whenever the page is used. In a second method, the count is incremented each time the page is used; when the count field (byte) is full the page manager automatically divides all count fields in the directory by 2 (that is, shifts the bits within the byte one position to the left dropping the least significant bit).

Directory entries are entered into the buffer 42 from the top (represented by arrow DE in FIG. 10) and pages are entered into buffer 42 from the bottom (represented by arrow PE in FIG. 10). FIG. 10A represents the situation at initialization when the page buffer is completely empty, the space being headed by a space pointer SP. The space pointer contains an indication of the extent of the space it heads and also the address in the buffer of the next space, if any.

Figure 10A:
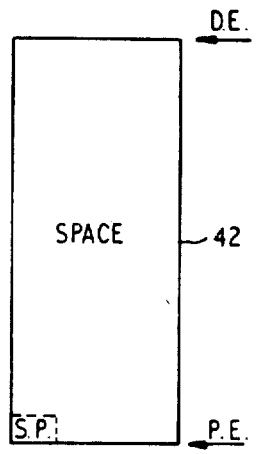
FIGS. 10A-10E illustrate an alternative method of storing pages in the random access memory.
Figure 10B:
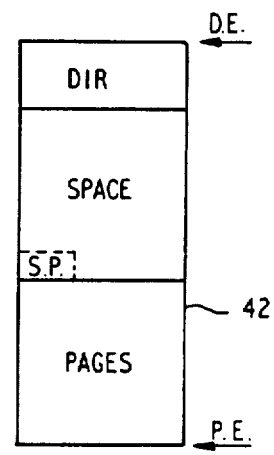
Figure 10C:
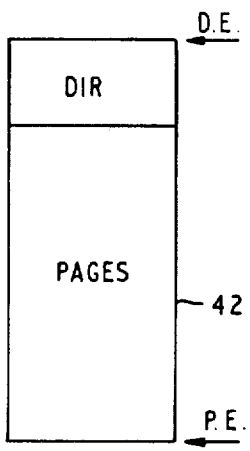
Figures 11, 12, 14:
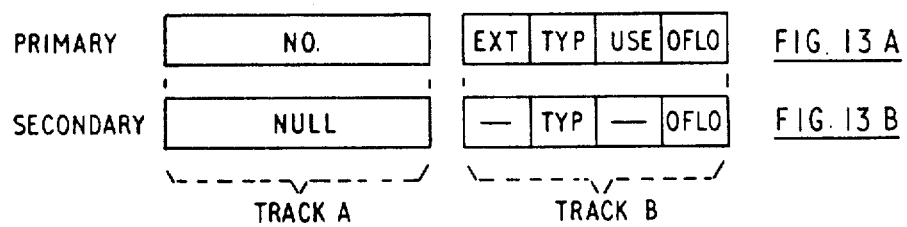
FIG. 11 illustrates an alternative method of storing data base pages on the magnetic disc file.
FIG. 12 shows the format for a directory entry for the method shown in FIG. 10.
FIG. 14 shows an example of typical directory entries of the type shown in FIG. 13.

FIG. 10B represents the situation where pages and their corresponding directories have been inserted in the buffer 42 as they are fetched from the host or the disc file. Eventually, as shown in FIG. 10C, the buffer will be completely filled with pages and their directory entries. When a new page has to be added to the buffer, space must be created by deleting infrequently used pages. There are two possibilities. Either the page manager can determine which page has the lowest frequency of use count and cause it to be deleted or the page manager can delete all pages having frequency of use counts below a threshold value. Preferably the page manager scans the directory examining the frequency of use byte. If its value is below the threshold value, its status byte is examined to determine whether it can be dropped. If the extent is equal to or greater than the required space, this page becomes the most eligible for deletion and is dropped. If its extent is not sufficient, scanning of the whole directory proceeds until either a sufficiently large page suitable for deletion is obtained or the whole directory has been scanned.

Figure 10D:
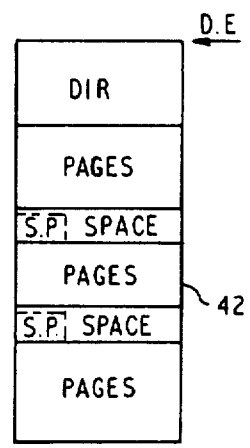

If there is insufficient space created by dropping one page, the page manager will delete more than one. As soon as a page (and its corresponding directory entry) is deleted, a space pointer is inserted into the space thereby created. If the space is only partially filled with the new page, a new space pointer is inserted at the head of the remaining space. This is illustrated in FIG. 10D where pages have been inserted into two spaces.

Figure 10E:
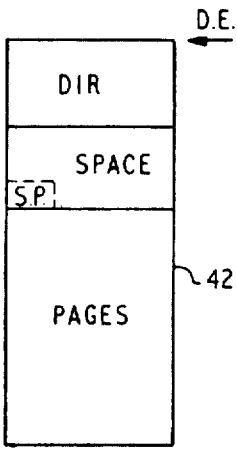

Periodically, to prevent excessive fragmentation of the space through the buffer, the space can be consolidated between the directory area and the pages. Consolidation of space is easier if undertaken from the directory end of the page buffer. Accordingly each space pointer preferably has within it the address of the space immediately preceding it as well as that of the space immediately following it. FIG. 10E represents the situation where the space has been consolidated.

Although not essential, at this time the page manager can also rearrange the pages into frequency-of-use order.

FIG. 11 is similar to FIG. 8A but illustrates an alternative technique for allocating pages to the different tracks of the magnetic disc file. Tracks 1 to 4 are allocated to store the random access memory backup (with or without a track use table or a table of the most recently used pages). Tracks 5 to 13 are allocated to store the local subsets and the area or local gazetteer while tracks 14 to 30 are designated for storing the journal and balance. Two tracks, tracks 31 and 32, are assigned to contain the disc directory with the tracks 38 to 77 being used to store pages. Tracks 33 to 37 are reserved for other purposes. As in the first embodiment the most frequently used pages are retained in storage in disc file 17. It should also be noted that in order to distribute wear evenly over the disc in the case of in contact recording and playback, the various tracks and especially the journal, balance and directory tracks can periodically be rewritten in different physical positions on the disc. The track numbers in FIG. 11 do not therefore represent actual track positions.

As in the earlier embodiment each track contains 26 blocks of 128 bytes each. However, in contrast to the earlier embodiment, the directory entries are not inserted at the beginning of each track but are located in two dedicated directory tracks which will be described with reference to FIGS. 13 and 14. FIG. 13 shows the format of the directory entry while FIG. 14 shows an example of how entries are made in the directory tracks.

Referring now to FIG. 13, there are two types of 8 byte directory entries. The first type, called a primary type is shown in FIG. 13A with the second type, called a secondary type, being shown in FIG. 13B. As will be seen from FIG. 13A, the first four bytes of a primary entry are used for the page number with the next four bytes being used to indicate the size of the page, the type of directory entry, a count indicating the frequency of use of the page and an overflow pointer pointing to the continuation (if any) of the page. The purpose of these bytes will become clearer later. As will be seen from FIG. 13B, a secondary entry also comprises 8 bytes but the first four, the fifth and the seventh bytes are not used. The sixth byte is used to indicate that the entry is a secondary type while the eighth byte is used as a pointer to any continuation of the field.

In this embodiment, the 40 tracks used for city-pairs and other pages from the host are each divided into 26 blocks. Thus, there are 1,040 blocks available for storage of pages. One page can occupy from 1 to 8 blocks, that is, 128 to 1,024 bytes. Each of the directory tracks is divided into 1,040 sectors (40 tracks × 26 blocks per track). Thus, the directory contains as many entries as there are blocks for storing pages. By partitioning the page storage area into fixed length blocks, fragmentation of space is avoided and time consuming space consolidation becomes unnecessary. Each directory entry, whether it is primary or secondary, contains a forward chaining pointer (OFLO) which links together all the blocks which comprise a particular page. The OFLO pointer is also used to manage unused space.

The directory entries are written on two tracks A and B. Track A contains the search fields (that is page number) while Track B contains the associated argument fields containing extent, type, frequency of use counts, and OFLO pointer. Each directory track will therefore contain 26 blocks of 40 four-byte directory entry data. The directory order is maintained on both tracks. Thus the nth search field (containing the name of the page) in track A and the nth argument field in track B constitutes a complete directory entry for the nth block in the page storage tracks. The address of any page can be calculated from the position of its directory entry. For example, if the required page number is found in the tenth directory entry, then the address of the page is found by adding 10 to the track/block address of the start of the page storage blocks.

The OFLO pointer allows segmenting of pages which are larger than 128 bytes. It can contain either the relative or the absolute address of the directory entry and block for the next segment of the page. The secondary type of directory entry is used for overflow entries and allows the disc manager to distinguish between pages which are more than one block (128 bytes) long. Furthermore, it is useful during deletion to ensure that only primary entries or primary entries and their associated secondary entries are deleted. Since the search field of a secondary entry contains a null key, it can be ignored during a search for a particular page number.

The use field in the directory entry is used in a similar manner to that described previously. When space is required, the disc manager searches the directory to determine which primary entry has a low use count. The associated page can then be deleted, any associated secondary entries being chained through their OFLO pointers to a free space pointer contained, for example, in the first available position in the directory.

Because the floppy diskette employs recording/playback head contact during accessing of a track, it can be expected that error rates in the directory tracks will increase due to their heavy use. This problem can be mitigated by periodically, for example, once daily, rewriting the paired directory tracks on to another area of the disc, for example, in tracks 33 to 37.

FIG. 14 shows an example of directory entries where the first entry is a free space. The disc manager contains a free space pointer which points to the first available free space on the disc. It does not necessarily have to be located in the first block.

In FIG. 14, the OFLO field contains the relative address of the overflow directory entry although as an alternative the absolute address could be used. Thus the first entry contains an OFLO pointer indicating that further free space will be located at directory entries 9 (1+8) and thence at entries 11, 12, etc. Entry 2 is a primary directory entry for page number AAAA. This page occupies two to three blocks (between 256 and 384 bytes) and as shown the OFLO pointer points to entry 3 (2+1); this secondary directory entry in turn has a pointer to entry 4 (3+1). Thus the three blocks of page storage corresponding to data entries 2, 3 and 4 contain page AAAA. It will be seen that the OFLO pointer in entry 4 contains a zero indicating that there is no further overflow.

Entry No. 5 is a primary entry relating to page No. BBBB which is less than 128 bytes in size. Entry No. 6 is a primary entry relating to page No. CCCC which is stored in the 6th and 8th blocks of storage. Pages Nos. DDDD and EEEE on the other hand are each equal or less than 128 bytes in length and are stored in the seventh and tenth blocks of storage. To summarize, each page requires 1 primary directory entry and from 0 to 7 secondary directory entries depending on its size. Each directory entry, primary or secondary, corresponds to a storage block on the disc file.

What has been described is a ticketing system employing various storage management techniques to ensure that the frequently used pages are retained in the local store. It will be appreciated that the invention is applicable to any distributed data base system in which a frequency-of-use technique is used to determine which pages of the whole data base are stored locally. There is, in such a system, a considerable difference between using a frequency-of-use technique and a recency-of-use technique. The latter is used, for example, in programming techniques such as virtual storage where the most recently fetched pages are held for some time after use; no attempt is made to retain pages in accordance with their frequency of use. With a distributed data base system, it is clearly an advantage to retain the most popular pages within the local data base since these will not correspond necessarily to the most recently used pages. A frequency-of-use technique tends to give a more adaptive system (that is, more responsive to changing conditions) than does a recency-of-use technique.

While the invention has been particularly shown and described with reference to the preferred embodiments hereof, it will be understood by those skilled in the art that several changes in form and detail may be made without departing from the spirit and scope of the invention.

What is claimed is:

1. In an interactive enquiry system of the type comprising a host data processor, a central data store controlled by the host processor and adapted to store a data base, a plurality of local subsystems connectible to the host processor, each local subsystem including a local data processor for controlling access to the host processor and a local data store comprising a random access memory and a magnetic disk file connected to the local processor and adapted to store part of the data base, at least one enquiry terminal in each local subsystem connected to the local processor for accessing any accessible item in the data base stored in the central store,
 wherein the random access memory portion of the local data store is divided into a first part adapted to store items accessed from the data base and a second part adapted to store a directory entry for each item stored within the first part, each directory entry containing a count which is an indication of the frequency of use of its associated item, said local processor updating said count whenever its associated item is used, said local subsystem further comprising:
 means operable when said first part has no space for a newly accessed item to scan the directory entries and determine the least frequently used items, and;
 means responsive to said scanning means to delete at least one of said least frequently used items to create sufficient space for the newly accessed item.

2. An interactive enquiry system as claimed in claim 1, in which the random access memory is so arranged that the boundary between the first part and the second part is floating.

3. An interactive enquiry system as claimed in claim 1 wherein each subsystem further comprises:
 means adapted to store items in selected tracks on said magnetic disc file and to store on said disc file associated directory entries which include an indication of the frequency of use of their associated items;
 means for searching said disc file directory entries whenever a requested item is not found in said random access memory to determine whether the requested item is stored on said magnetic disc, and;
 means operable when the disc file has no space for a newly accessed item to scan said disc file directory to locate least frequently used item or items and adapted to delete the least frequently used item or items to create sufficient space for the newly accessed item.

4. An interactive enquiry system as claimed in claim 3, wherein each subsystem further comprises:
 means for storing a directory entry associated with a particular item on the same track as that particular item.

5. An interactive enquiry system as claimed in claim 4, wherein each subsystem further comprises:

means for performing a hashing operation on a number identifying an item to determine in which track or group of tracks that item should be stored.

6. An interactive enquiry system as claimed in claim 5, wherein each magnetic disc file includes a plurality of dedicated tracks for storing items, said dedicated tracks being divided into a plurality of storage blocks and at least one dedicated directory track containing a plurality of sectors corresponding in number to the number of storage blocks, each directory sector containing an entry identifying the item stored in the corresponding storage block.

7. An interactive enquiry system as claim in claim 3, wherein each disc file includes a pair of directory tracks each divided into a plurality of sectors equal in number to the number of storage blocks, a directory entry for each block being contained partly in one of the pair and partly in the other of the pair.

8. An interactive enquiry system as claimed in claim 7, wherein each subsystem further comprises:
 means operable when a required item is not within the random access memory for simultaneously accessing the disc file and the central store and adapted to cancel the request to the central store when the item is first received from the disc file and alternately to cancel the request to the disc file when the item is first received from the central store.

9. An interactive enquiry system as claimed in claim 1 wherein said local subsystem further comprises:
 means for associating a frequency of use count with each item stored in the local store, and;
 means for increasing the count associated with a particular item whenever that item is accessed.

10. An interactive enquiry system as claimed in claim 1 wherein each subsystem further comprises:
 means for associating a frequency of use count with each item stored in the local store;
 means for assigning a high count whenever the particular item is accessed, and;
 means for periodically decreasing the count for all items stored in the local store.

11. In an interactive enquiry system of the type comprising a host data processor, a central data store controlled by the host processor and adapted to store a tree structured data base, a plurality of local subsystems connectible to the host processor, each local subsystem including a local data processor for controlling access to the host processor and a local data store connected to the local processor and adapted to store part of the data base, at least one enquiry terminal in each local subsystem connected to the local processor for accessing any accessible item in the data base stored in the central store, the method of concentrating most frequently used pages of said tree structured data base toward one end of a page buffer in a random access memory portion of said local data store comprising the steps of:
 (1) determining if sufficient space exists in said page buffer to store a page retrieved from said tree structured data base at said host processor and proceeding to step 5 if sufficient space exists;
 (2) determining if the number of pages in a first push down stack of pages within said page buffer exceeds a predefined minimum number and proceeding to step 4 if said minimum is not exceeded;
 (3) deleting the bottom most page from said first push down stack and proceeding to step 1;
 (4) deleting the bottom most page from a second push down stack of pages within said page buffer and proceeding to step 1;
 (5) adding said retrieved page to the top of said first push down stack if the page level number of said retrieved page is above a predefined threshold number and adding said retrieved page to the top of said second push down stack if said page level number is below said predefined threshold number.

* * * * *